S. S. COOK.
Carriage-Axles.

No. 145,280.  Patented Dec. 9, 1873.

Witnesses
Saml. M. Barton
E. E. Emerson

Inventor
Simeon S. Cook
by his atty
Carroll D. Wright

UNITED STATES PATENT OFFICE.

SIMEON S. COOK, OF WOONSOCKET, RHODE ISLAND.

IMPROVEMENT IN CARRIAGE-AXLES.

Specification forming part of Letters Patent No. 145,280, dated December 9, 1873; application filed June 30, 1873.

*To all whom it may concern:*

Figure 1:
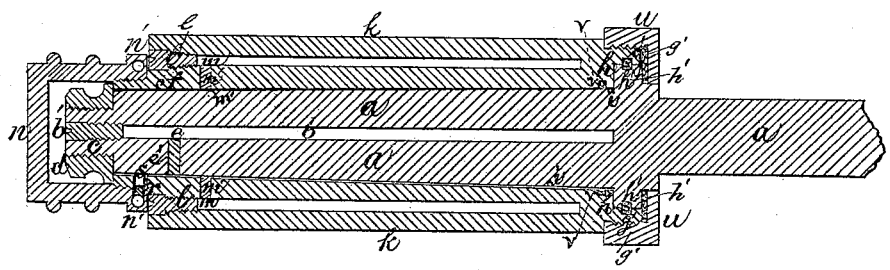
Figure 2:
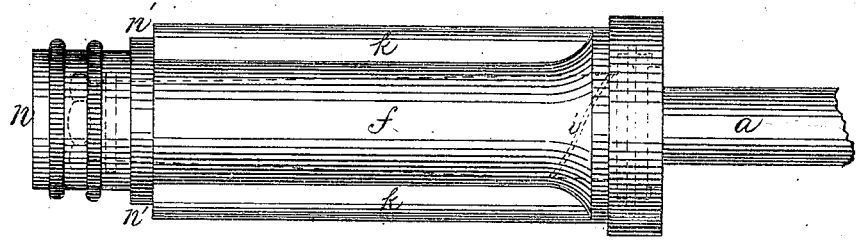
Figure 3:
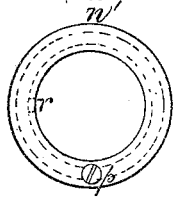

Be it known that I, SIMEON S. COOK, of Woonsocket, in the county of Providence and State of Rhode Island, have invented certain Improvements in Carriage-Axles, of which the following is a specification:

Figure 1 of the accompanying drawings is a central vertical longitudinal section, and Fig. 2 is a side view, of my improved carriage-axle. Fig. 3 is a view of the inner face of the outer screw-cap of the same.

The present invention relates to certain new and useful improvements in carriage-axles, having for their principal objects the providing a ready and convenient method of lubricating the axle, to diminish the frequency of the application of the oil or other lubricating matter, and to provide an effective method of packing the axle so as to exclude dust and prevent leakage. My improvements consist, mainly, in an axle arranged, as will be hereinafter more fully described, to turn in a box, and to be readily and evenly lubricated by oil or other lubricating matter introduced into a channel or channels formed in the axle, or in tubes formed on the box, or in the box-cap, or in any two or all of the same, and percolating through a wooden or other porous plug or plugs inserted in an aperture or apertures formed in the said axle, or tubes, or cap, or in any two or all of the same. These improvements also consist of forming the axle with a grooved flange, and forming the box with one or more internal grooves, and providing it with an inner screw-cap, to contain packing, to prevent leakage, and to exclude dust; also, in forming a diagonal or spiral groove in the exterior periphery of the axle, to carry back the oil away from its inner end.

In the drawings, *a* represents an axle, tapering from the inner to the outer end, and formed with a central channel, *b*, opened and closed at one end, for the reception and retention of oil or other lubricating matter, by means of a screw, *b'*, that meshes with female screw-threads formed on the inner periphery of a screw-stem, *c*, formed on the outer end of the axle *a*, to receive a screw-nut, *d*, that abuts against the outer screw end of a box, *f*, to hold and prevent the sliding of said box. The axle *a* is formed on the interior, near its outer end, with a transverse aperture, communicating with the channel *b*, and filled with a wooden or other porous plug, *e*. The axle *a* extends through a box, *f*, which is of metal, and is formed with a tapering bore to receive the axle *a*, which, at its inner end, is formed with an exterior flange, *h*, beyond which the termination of the box *f* is recessed, and formed with outer screw-threads, to form a seat for and to receive a screw-cap, *u*. The inside periphery of the box *f* is formed at the inner end of the bore, and at the end of the inner screw termination, with grooves *g' v;* or, if desired, the box *f* may be formed with only one of the grooves. The exterior flange *h* has, on its outer periphery, a groove, *h'*, and fits into the inner screw end of the box *f*, which is recessed to receive and form a seat for it against the end of the bore. The grooves *g'*, *h'*, and *v* are formed to contain felt or other suitable packing, which is also placed in the screw-cap *u*, to exclude dust and prevent leakage. On the outer periphery of the axle *a*, near its inner end, is formed a spiral or diagonal groove, *i*, for the purpose of carrying back the oil away from the inner end of the axle. The box *f* is cut down or formed on the exterior periphery, so as to leave on each side, or at top and bottom, a longitudinal hollow flange or tube, *k*, for the reception of the lubricating fluid, which is admitted and retained in the flanges or tubes *k* by the removal and insertion of screws *l* in the outer ends of the tubes *k*. Near the outer end of the box *f*, on the interior, are transverse apertures, connecting with the oil-channels of the tubes *k*, and provided with wooden or other porous plugs *m'*. The outer end of the box *f* is formed on the exterior periphery with screw-threads, which receive female screw-threads of a screw-cap, *n*, that is formed with a hollow rim or collar, *n'*, which abuts against the end of and closes the box *f*, and is formed, on its inner face, with an aperture, provided with a screw, *p*, and has opening on its inner periphery an aperture, closed with a wooden or other porous plug, *r*. The box *f* is formed, at its outer end, close to the shoulder or seat of the cap *n*, with an aperture, *s*, arranged opposite to, so as to receive the oil or other lubricating matter from, the aperture of the cap *n*, for the admission of oil to the axle.

The box *f* and cap *n* may, if desired, be formed and used without their oil channels, apertures, and porous plugs, so that the lubricating fluid may be supplied from the axle-channel only; or the axle may be formed and used without its channel and apertures, and the oil introduced either from the cap $n$ or from the tubes $k$, or from both. The drawings are made with the three methods, as shown, to illustrate modifications of my improvements, by which the lubricating fluid may be applied to the axle in different ways. The flange or shoulder $g$, if desired, may be formed without its groove $g'$, the packing in this case being held in the groove or grooves of the box and in the cap $u$.

The operation of my invention is as follows: By removing the screw $b'$, the oil or other lubricating matter is introduced into the channel $b$, and percolates slowly through the plug $e$ upon the axle $a$. The heat produced by the revolution of the box $f$ causes the lubricating fluid to expand in the channel, and force its way through the porous plug, and the cooling of the oil by the rest of the box causes a vacuum, which is filled by air and the return of a portion of the lubricating fluid through the porous plug, the revolution of the box again heating and expanding the fluid, and forcing it through the plug upon the axle.

It will thus be seen that a constant supply of lubricating fluid is readily introduced, and slowly, but sufficiently and evenly, supplied to the axle, thereby requiring but a small amount of fluid to be used, and necessitating its removal only at long intervals of time, say from three to six months, according to the use of the vehicle.

By means of the spiral or diagonal groove $i$, the lubricating fluid is carried back by the revolution of the box away from, so as to prevent its collecting at, the inner end of the axle; and, by means of the flange $h$ fitting into the recessed end of the box $f$, and supplied with packing contained in its groove, and of the packing situated in the groove or grooves $g'$ $v$ and in the cap $u$, leakage of the lubricating fluid is prevented, and dust excluded from the box and axle.

I am aware that hollow longitudinal ribs provided with orifices have heretofore been employed in the axle-boxes of carriages, and I am also aware that a hollow axle having an oil-orifice has been used; and I therefore lay no claim to such inventions.

Having thus fully described my invention, what I claim, and desire to have secured to me by Letters Patent, is—

1. The axle-box having longitudinal ribs $k\,k$, provided with screws $l\,l$ at their outer ends, and communicating with the axle through orifices $m$, filled with porous plugs $m'$, substantially as described, for the purpose specified.

2. The axle $a$, having the collar $h$, spiral groove $i$, and internal channel $b$, communicating with the exterior of the axle through porous plug $e$ in the orifice $e'$, substantially as described, for the purpose specified.

In testimony whereof I have signed my name to this specification in the presence of two subscribing witnesses.

SIMEON S. COOK.

Witnesses:
J. C. MOLTEN,
A. B. CHURCH.